United States Patent Office 2,980,599
Patented Apr. 18, 1961

2,980,599
MODERATOR COMPOSITION

Jerome G. Morse, Baltimore County, Md., assignor to The Martin Company, a corporation of Maryland No Drawing. Filed Jan. 9, 1956, Ser. No. 557,869

10 Claims. (Cl. 204—154.2)

The present invention relates to a system for moderating a nuclear reaction in a nuclear reactor and more particularly to a system of the type described wherein an organic moderator is intimately circulated in contact with a nuclear reactive mass to control neutron energies emitted by the fission reaction.

One of the principal difficulties that have been encountered in systems of this character is that the moderator material, if it be of an organic nature, has a tendency to polymerize or to degrade upon being subjected to the radiation energies of the nuclear reactor. This naturally brings about either an increase in the molecular weight of the organic substance due to the polymer formation or to a breakdown of the organic substance accompanied by coking and the generation of gases principally hydrogen. If there is an increase in molecular weight, this in turn serves to increase the viscosity of the medium and if this is not compensated for, eventually the medium loses its fluidity. When this occurs, the medium can no longer perform its function in the reactor system.

Accordingly, the present invention relates to systems of the character described which include means for preventing or inhibiting the deterioration of the moderator medium by polymerization or degradation in order that it will retain its fluidity and be able to perform its intended function for considerably longer periods of time. This is accomplished essentially by including with the moderator material, an inhibitor which possesses maximum radiation inhibitory properties.

It is an object of the present invention to provide a system for deriving energy from a nuclear source which will function expediently and economically for longer periods of time, than have heretofore been possible when using an organic moderator.

Other and further objects of the present invention will become more readily apparent from the following detailed description.

The organic moderator is preferably composed of a poly-phenyl or mixtures thereof and may be a bi-phenyl, the isomeric ter-phenyls or quaterphenyl. Although these are the preferred organic moderators for the system of the present invention, it will be understood that other types and varieties of organic moderators which are subject to the same damage as the polyphenyls are within the contemplation of the present invention. Radiation damage to the moderator is defined in terms of coking, generation of hydrogen gas, and polymer formation, all of which are interrelated. It is the object of the inhibitor of the present invention to perform its function to minimize this damage.

In general, the chemical compounds exhibiting maximum radiation inhibitory properties are characterized by the presence of an amino group that is beta or gamma to a sulfhydryl or isothiouronium group. Among those compounds which are characterized as described may be mentioned beta-mercaptoethylamine; S, beta-aminoethylisothiouronium.Br; S, gamma-aminopropylisothiouronium.Br; cysteine; and glutathione. The range of concentrations of inhibitor in the moderator is from about 0.01% to about 15.0% by weight, although it is preferred that the concentration of inhibitor be from about 2% by weight to about 10% by weight.

The following table will illustrate specific combinations of poly-phenyls and an inhibitor which will serve to prevent polymerization or degradation of the moderator medium (poly-phenyl) to an extent that would prohibit or make impractical continued use of the moderator medium in controlling neutron energies emitted by a fission reaction.

| | Moderator and Inhibitor | Percent by Weight |
|---|---|---|
| 1 | meta terphenyl | 98 |
| | cysteinamine | 2 |
| 2 | mixture of 96% meta terphenyl and 4% para terphenyl. | 97 |
| | cysteine | 3 |
| 3 | biphenyl | 94 |
| | S,beta-Aminoethylisothiouronium.Br | 6 |
| 4 | biphenyl | 92 |
| | S,gamma-Aminopropylisothiouronium.Br | 8 |
| 5 | meta terphenyl | 96 |
| | S,beta-Aminoethylisothiouronium.Br | 4 |
| 6 | mixture of biphenyl, quaterphenyl and meta terphenyl. | 90 |
| | Glutathione | 10 |
| 7 | Quaterphenyl | 99 |
| | Beta-Mercaptoethylamine | 1 |
| 8 | mixture of meta terphenyl and para terphenyl | 99.95 |
| | Beta-Mercaptoethylamine | .05 |
| 9 | mixture of quaterphenyl and ortho terphenyl | 99.86 |
| | S, gamma-Aminopropylisothiouronium.Br | .14 |
| 10 | mixture of ortho terphenyl, meta terphenyl and para terphenyl. | 99.35 |
| | Cysteine | .65 |
| 11 | mixture of biphenyl, meta terphenyl and para terphenyl. | 88 |
| | Beta-Mercaptoethylamine | 12 |
| 12 | mixture of ortho terphenyl and meta terphenyl | 85.2 |
| | Cysteine | 14.8 |

As will be recalled, the organic compounds selected as the inhibitor for the moderator is one characterized by the presence of an amino group and either a sulfhydryl group or an isothiouronium group. In its most preferred aspects, the inhibitor will be an organic compound wherein the amino group is located in a beta or gamma position with respect to a sulfhydryl or isothiouronium group.

Although the invention has been shown and described in terms of specific examples, nevertheless, changes obvious to one skilled in the art are within the spirit, scope and contemplation of the present invention.

What is claimed is:

1. A process of moderating a nuclear reaction in a reactor which includes the step of circulating in close proximity to a neutron fissionable mass a moderating medium comprised by at least one moderator compound selected from the group consisting of biphenyl, m-terphenyl, p-terphenyl, o-terphenyl and quaterphenyl, and an inhibitor compound selected from the group consisting of beta-mercaptoethylamine, S,beta-aminoethylisothiouronium.Br, S - gamma - aminopropylisothiouronium. Br and gluthathione.

2. A process as defined in claim 1 wherein said organic compound is beta-mercaptoethylamine.

3. A process as defined in claim 1 wherein said organic compound is S, beta-aminoethylisothiouronium.Br.

4. A process as defined in claim 1 wherein said organic compound is S, gamma-aminopropylisothiouronium.Br.

5. A process as defined in claim 1 wherein said organic compound is glutathione.

6. A composition for moderating a nuclear reaction in a nuclear reactor comprising a mixture of at least one moderator compound selected from the group consisting of biphenyl, m-terphenyl, p-terphenyl, o-terphenyl and quaterphenyl, and an inhibitor compound selected from the group consisting of beta-mercaptoethylamine, S, beta-aminoethylisothiouronium.Br, S, gamma-aminoethylisothiouronium.Br and gluthathione.

7. A composition as defined in claim 6 wherein said organic compound is beta-mercaptoethylamine.

8. A composition as defined in claim 6 wherein said organic compound is S, beta-aminoethylisothiouronium.Br.

9. A composition as defined in claim 6 wherein said organic compound is S, gamma-aminopropylisothiouronium.Br.

10. A composition as defined in claim 6 wherein said organic compound is glutathione.

References Cited in the file of this patent

UNITED STATES PATENTS

| | | |
|---|---|---|
| 2,708,656 | Fermi et al. | May 17, 1955 |

FOREIGN PATENTS

| | | |
|---|---|---|
| 497,939 | Great Britain | Dec. 28, 1938 |
| 697,601 | Great Britain | Sept. 23, 1953 |
| 708,901 | Great Britain | May 12, 1954 |

OTHER REFERENCES

U.S. Atomic Energy Comm., A.E.C.D. 3711, Mar. 15, 1955.

U.S Atomic Energy Commission ANL–5588, page 38, July 1950.